United States Patent [19]

Keogh

[11] Patent Number: 4,571,111

[45] Date of Patent: Feb. 18, 1986

[54] KNOB-TO-SHAFT ASSEMBLY

[75] Inventor: Kenneth D. Keogh, Wilmington, Del.

[73] Assignee: Southco, Inc., Concordville, Pa.

[21] Appl. No.: 505,219

[22] Filed: Jun. 17, 1983

[51] Int. Cl.⁴ .......................... F16D 1/06; B25G 3/14
[52] U.S. Cl. .................................... 403/282; 403/361;
            16/118; 16/121; 16/DIG. 30; 74/553
[58] Field of Search ............... 403/282, 274, 361, 359;
        16/118, 116 R, 121, DIG. 30, DIG. 40, DIG.
                                              41; 74/553

[56] References Cited

U.S. PATENT DOCUMENTS

| | | | |
|---|---|---|---|
| 2,443,034 | 6/1948 | Hallstrand | 403/359 |
| 2,621,947 | 12/1952 | Markvart | 403/274 |
| 3,074,292 | 1/1963 | Polman | 403/361 |
| 3,338,604 | 8/1967 | Van Buren | 403/361 |
| 3,730,570 | 5/1973 | Brochstein | 403/361 |
| 3,826,034 | 7/1974 | Herek | 403/361 |
| 3,830,271 | 8/1974 | Soubitez | 403/282 |

Primary Examiner—Cornelius J. Husar
Assistant Examiner—Peter M. Cuomo
Attorney, Agent, or Firm—Paul & Paul

[57] ABSTRACT

A knob-to-shaft assembly comprises a plastic knob having a cylindrical recess having a diameter corresponding to that of the outside diameter of the shaft onto which the knob is to be manually pushed. Projecting from the outside diameter of the shaft, at the forward end thereof, is an annular band comprising a series of outwardly projecting barbs created by an angled knurl which is formed on the rearward surface of an annular V-shape groove which is provided near the forward end of the shaft. Projecting slightly forwardly from the V-shape notch is a pilot portion whose outside diameter corresponds to that of the shaft.

3 Claims, 6 Drawing Figures

KNOB-TO-SHAFT ASSEMBLY

BACKGROUND OF THE INVENTION

This invention relates to a knob-to-shaft assembly. The invention relates in particular to improved means for facilitating pushing a plastic knob manually onto a metal shaft. The improved assembly is such that while the knob may be pushed by hand on to the shaft, a force considerably greater than that which can be applied by hand is necessary to pull the knob off of the shaft.

It is known in the prior art to stake two barbs on the shaft for the purpose of permitting push-on of the knob by hand while preventing pull-off by manual force. However, the two-barb design of the prior art has relative low resistance to torque forces and in at least some cases it is necessary to provide flats on the shaft and a mating shape in the knob.

SUMMARY OF THE INVENTION

A broad object of the present invention is to provide a knob-to-shaft assembly which has advantages over that provided by the prior art.

A principal broad object is to provide a knob-to-shaft assembly in which the pull-off force substantially exceeds the push-on force.

Another object is to provide a knob-to-shaft assembly in which the torque resistance is significantly higher than that provided in the two-barb design of the prior art.

Another object is to provide a knob-to-shaft assembly in which the knob and shaft can be produced completely in the primary operation machine thereby avoiding secondary operations such as are required in the prior art two-barb design for staking the barb and milling the flat.

Yet another object is to provide a knob-to-shaft assembly which requires no extra parts such as spring clips, metal inserts, set screws, etc.

Yet another object is to provide a knob-to-shaft assembly having a design which allows the knob to be installed at any axial position on the shaft depending upon other variables such as the thickness of the panel used between the fastener assembly and the knob.

Yet another object is to provide a knob-to-shaft assembly in which the diameter over the knurl is much easier to control than the distance over the barbs in the prior art two-barb design.

According to the present invention, the foregoing and other objects of invention are achieved by providing at the forward end of the shaft an external narrow continuous peripheral knurled surface having a series of barbs which project radially beyond the peripheral surface of the other portion of the shaft. The knurled surface projects downwardly and inwardly, preferably at an angle of between 30 degrees and 60 degress.

In a preferred embodiment, the knurled surface appears on the rearward wall of a V-shaped peripheral groove or notch which is provided in the shaft near its forward end. A pilot portion may preferably be provided forward of the V-shaped groove or notch.

As used in the specification and claims of this patent application, the "forward end" of the shaft is that end which receives the knob.

BRIEF DESCRIPTION OF THE DRAWINGS

FIG. 4 is an enlarged view of the rectangular area 4 in FIG. 3 and illustrates how the inner wall surface of the recess in the plastic knob is slightly deformed as it slides over the projecting barbs of the knurled surface of the metal shaft during push-on.

DETAILED DESCRIPTION OF THE PREFERRED EMBODIMENTS

Figure 1:
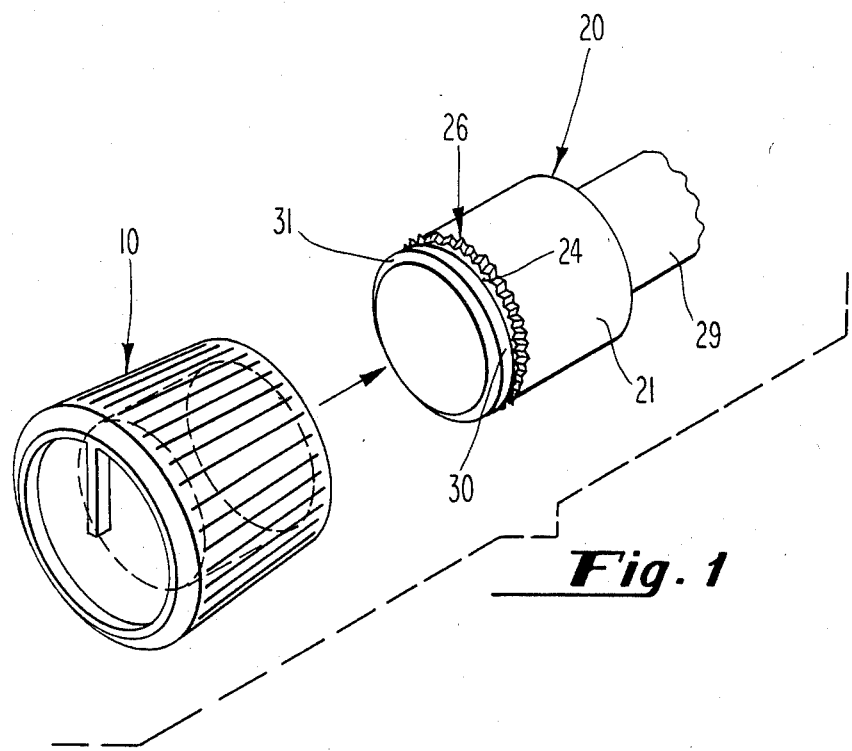
FIG. 1 is an exploded perspective view showing the knob and the shaft.

FIG. 1 is an exploded perspective view showing a knob 10 and a shaft 20 having an enlarged head 21 and smaller diameter portion 29. So far as the invention is concerned, the shaft 20 could be of uniform diameter throughout; it need not have an enlarged head. Accordingly, for convenience, throughout the remainder of the description, reference will merely be made to shaft 20.

Figure 2:
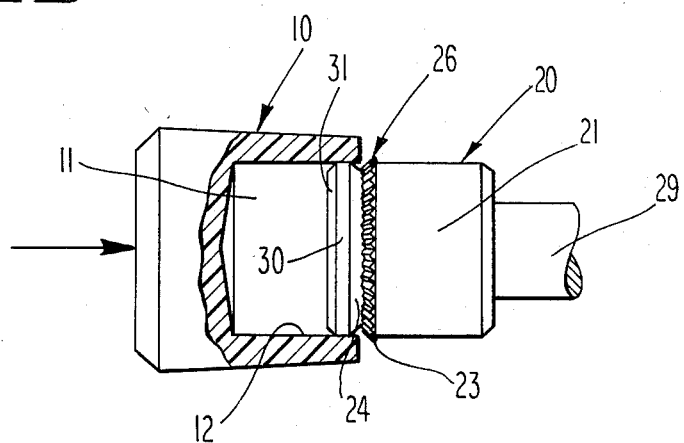
FIG. 2 is a side view of the knob-to-shaft assembly showing the knob partially broken away and illustrating the pilot portion of the shaft within the recess of the knob as the knob is about to be pushed onto the shaft.
Figure 3:
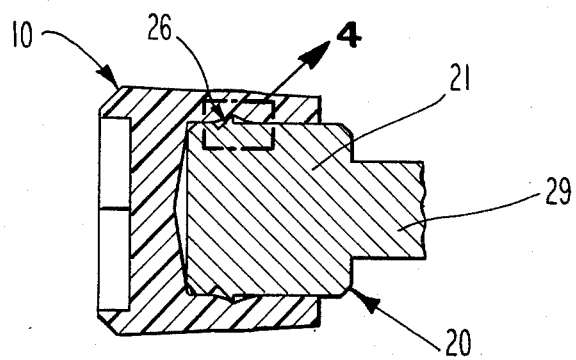
FIG. 3 is a view in section showing the knob after it has been fully pushed onto the shaft.

FIGS. 1 and 2 illustrate a preferred form of the present invention. In the preferred form, the shaft 20 is provided near its forward end with a peripheral V-shaped notch or groove 24. The location of groove 24 is slightly rearward of the extreme forward end of the shaft 20, thereby creating a pilot portion 30 whose outside diameter corresponds to that of portion 21 of the shaft 20 into which the V-shaped groove 24 is cut or otherwise formed. The foremost end of the pilot portion 30 may preferably be beveled as at 31.

Figure 4:
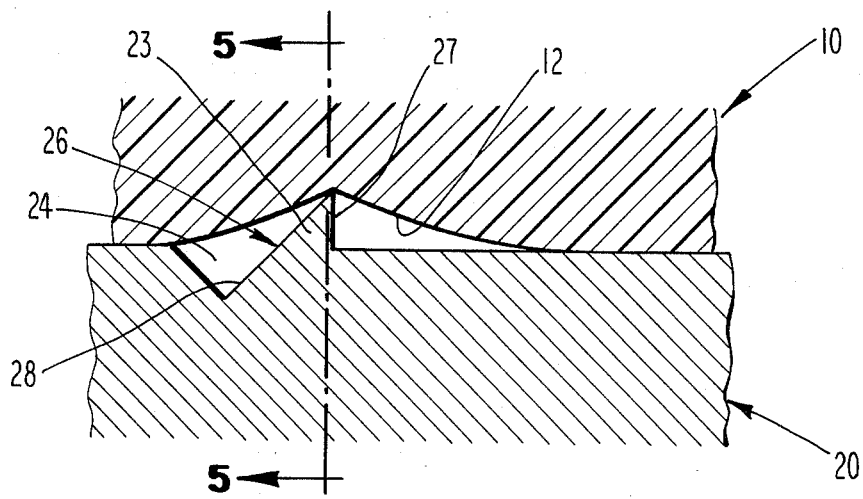
Figure 5:
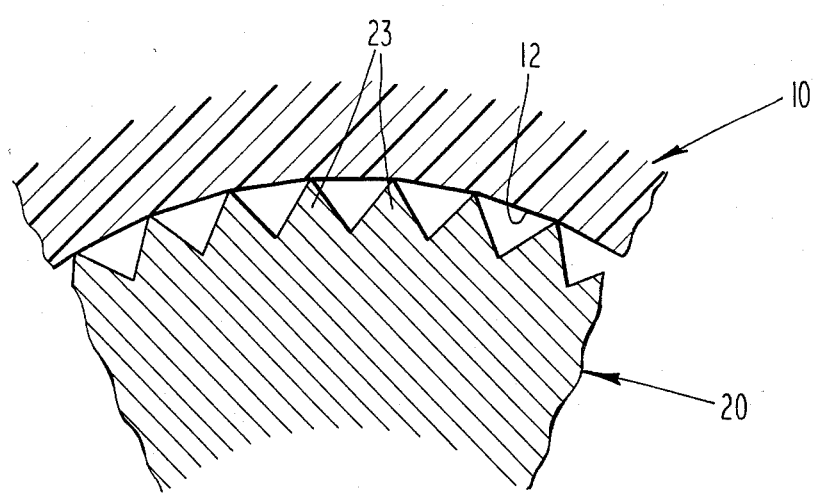
FIG. 5 is a view looking along the line 5—5 of FIG. 4 and shows a fraction of the annular series of barbs which project from the peripheral surface of the shaft.
Figure 6:
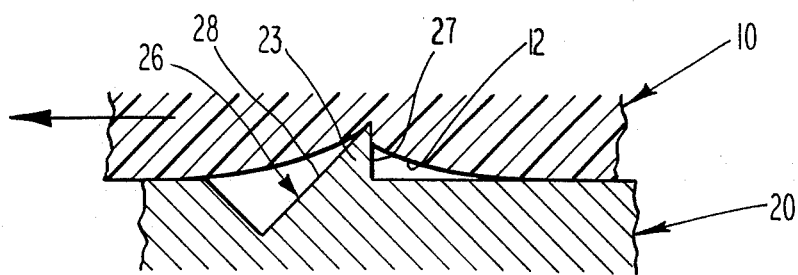
FIG. 6 is a view which illustrates what happens when a pull-off force is applied to the knob.

In accordance with the present invention, there is provided at the rearward surface 28 of the two inclined surfaces or sidewalls of the V-shaped groove notch 24, an angled knurl 26 having an upper or outer diameter which is larger than that of the other portion 21 of shaft 20, thereby creating an annular series of barbs 23 at the intersection of the knurl 26 with the outside diameter of the shaft 20. These barbs 23 project beyond the peripheral surface of the shaft 20, as seen in FIGS. 4, 5 and 6. The lower or inner diameter of the angled knurl 26 is smaller than the diameter of the other portion 21 of shaft 20.

The diameter of portion 21 of shaft 20, and also the diameter of the pilot 30, correspond to the diameter of recess 11 in the plastic knob 10. It is to be noted that the barbs 23 are inclined upwardly and outwardly in the direction in which the knob 10 is moved when it is pushed by hand onto the shaft 20. As a result, the inner surface 12 of the recess 11 is deformed slightly as the plastic surface slides over the barbs 23. This is illustrated in FIG. 4.

When, however, a force is applied to knob 10 in the pull-off direction, the inner surface 12 of the recess 11 of the plastic knob 10 encounters the radial surfaces 27 of the barbs 23 and since these radial surfaces 27 are perpendicular to the direction in which knob 10 is being pulled and is attempting to move, the barbs 23 tend to dig in to the plastic surface 12, thereby preventing pull-off unless a force is applied which is considerably greater than the force which was required to push the knob onto the shaft 20.

The knurl 26 could be placed on the very end of the shaft 20. By positioning the knurl in the groove 24, the pilot portion 30, beyond or forward of the groove, functions to keep the knob 10 straight when it is pushed on.

It has been found that the annular series of barbs cause the pull-off forces to exceed the push-on force by 50–100 percent. That is, the actual force required to pull the knob off has been found to be from 50 percent to 100 percent more than the force needed to push the knob on. The advantage of this is that with the amount of knurling properly controlled, a pull-off force in excess of what can normally be applied by hand can be obtained, yet the knob can still be assembled by hand.

As indicated previously, the torque resistance of the new knob-to-shaft assembly is significantly improved over the two-barb prior art design.

What is claimed is:

1. A knob-to-shaft assembly comprising:
   (a) a knob of plastic material, said knob having a cylindrical recess at a rearward end;
   (b) a shaft of metal material receiving said knob at a forward end, said shaft being generally cylindrical and having an annular V-shaped groove having inclined forward and rearward sidewalls near said forward end, said shaft having an outside diameter corresponding to that of the cylindrical recess of said knob;
   (c) said shaft having an external peripheral band of continuous angled knurl on said inclined rearward sidewall of said V-shaped groove, the upper outer diameter of said angled knurl being larger than said outside diameter of said shaft, said larger diameter of said angled knurl being formed by an annular series of barbs each of which projects beyond the said outside diameter of said shaft, the lower inner diameter of said angled knurl being in said groove and being less than said outside diameter of said shaft.

2. A knob-to-shaft assembly according to claim 1 wherein said rearward sidewall of said V-shaped groove projects downwardly and inwardly at an angle between 30 degrees and 60 degrees with respect to the axis of said shaft.

3. A knob-to-shaft assembly according to claim 1 wherein
   a pilot portion is provided forward of said groove, said pilot portion having an outside diameter corresponding to that of said shaft.

* * * * *